United States Patent [19]
Prakken et al.

[11] Patent Number: 5,778,640
[45] Date of Patent: Jul. 14, 1998

[54] APPARATUS AND METHOD FOR PACKING STAND-UP POUCHES INTO CARTONS

[75] Inventors: Nicholaas Martin Prakken, Chester; John James Hendry, Richmond, both of Va.

[73] Assignee: Blueprint Automation, Inc., Richmond, Va.

[21] Appl. No.: 745,174

[22] Filed: Nov. 7, 1996

[51] Int. Cl.[6] .............................. B65B 5/10; B65B 35/48; B65B 39/12

[52] U.S. Cl. ................ 53/475; 53/244; 53/258; 53/260; 53/538

[58] Field of Search .............................. 53/475, 473, 448, 53/443, 447, 258, 255, 260, 247, 244, 245, 538, 536, 535

[56] References Cited

U.S. PATENT DOCUMENTS

| | | | |
|---|---|---|---|
| 4,608,808 | 9/1986 | Ryan et al. | 53/260 X |
| 4,660,352 | 4/1987 | Deines et al. | 53/475 X |
| 4,776,148 | 10/1988 | Mingozzi | 53/538 X |
| 4,800,703 | 1/1989 | Goodman | 53/538 X |
| 5,044,143 | 9/1991 | Ako et al. | 53/475 X |

*Primary Examiner*—James F. Coan

[57] ABSTRACT

An apparatus and method are disclosed where stand-up pouches are partially flattened and arranged in an overlapping row where they are picked-up by a thin cantilevered vacuum pick-up head and placed into the open side of a tilted carton with the sequence being repeated until the carton is filled.

12 Claims, 10 Drawing Sheets

PLAN VIEW

BAG-ISO VIEW
(SETTLED)

BAG-SIDE VIEW
(SETTLED)

BAG-END VIEW
(SETTLED)

BAG-SIDE VIEW
(FLATTENED)

BAG-END VIEW
(FLATTENED)

SUCTION HEAD PICKUP
(0,0) HOME BASE

MOVEMENT
SUCTION HEAD PICKUP
PACK PICK-UP
HEAD TILT (-4°)

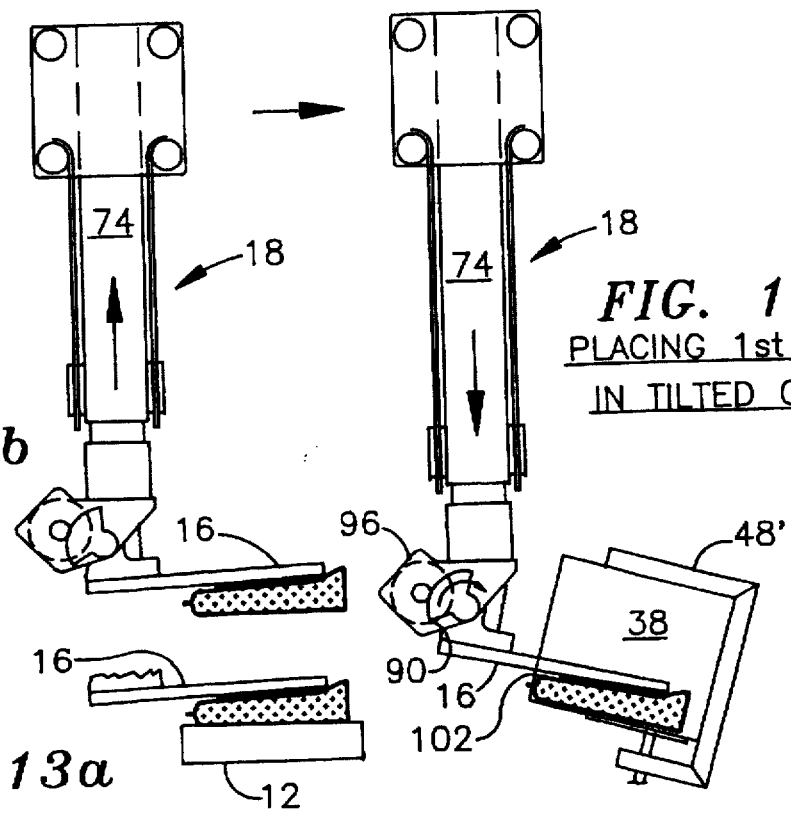
FIG. 13b
FIG. 13a
FIG. 13c
PLACING 1st ROW IN TILTED CASE
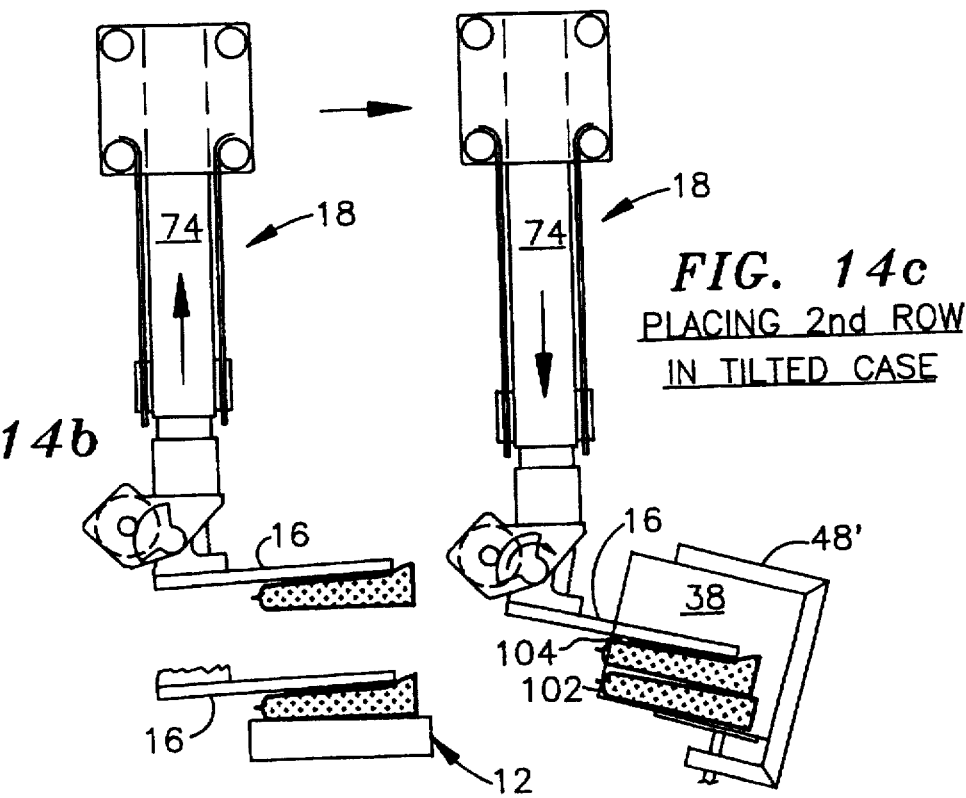
FIG. 14b
FIG. 14a
FIG. 14c
PLACING 2nd ROW IN TILTED CASE

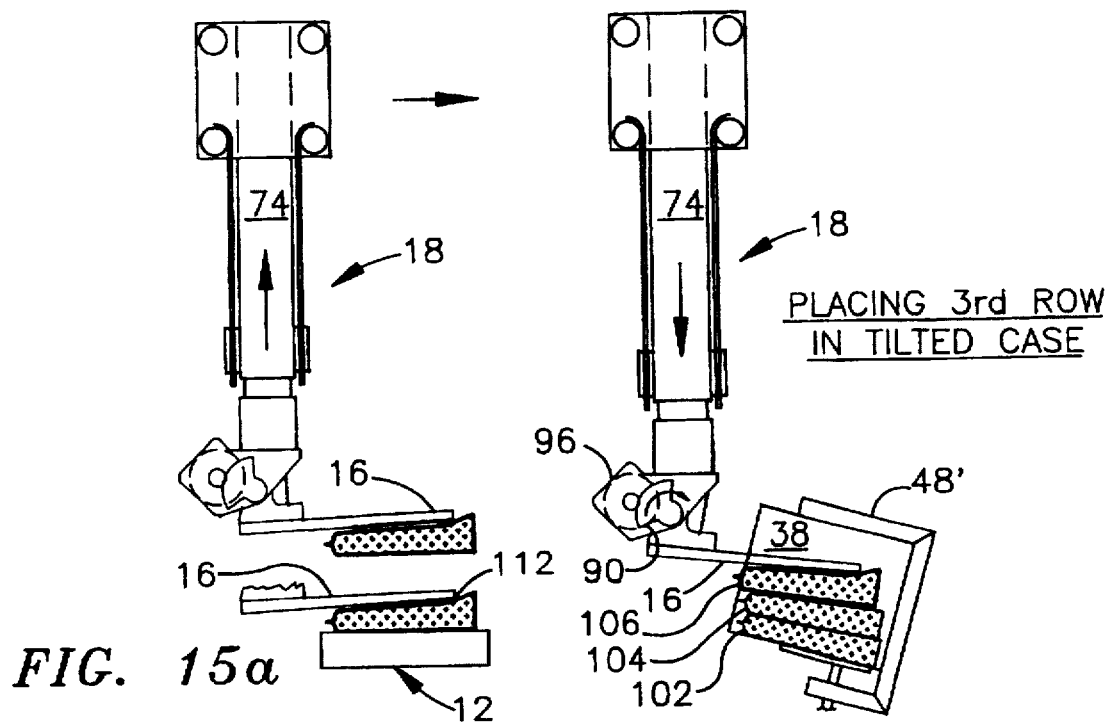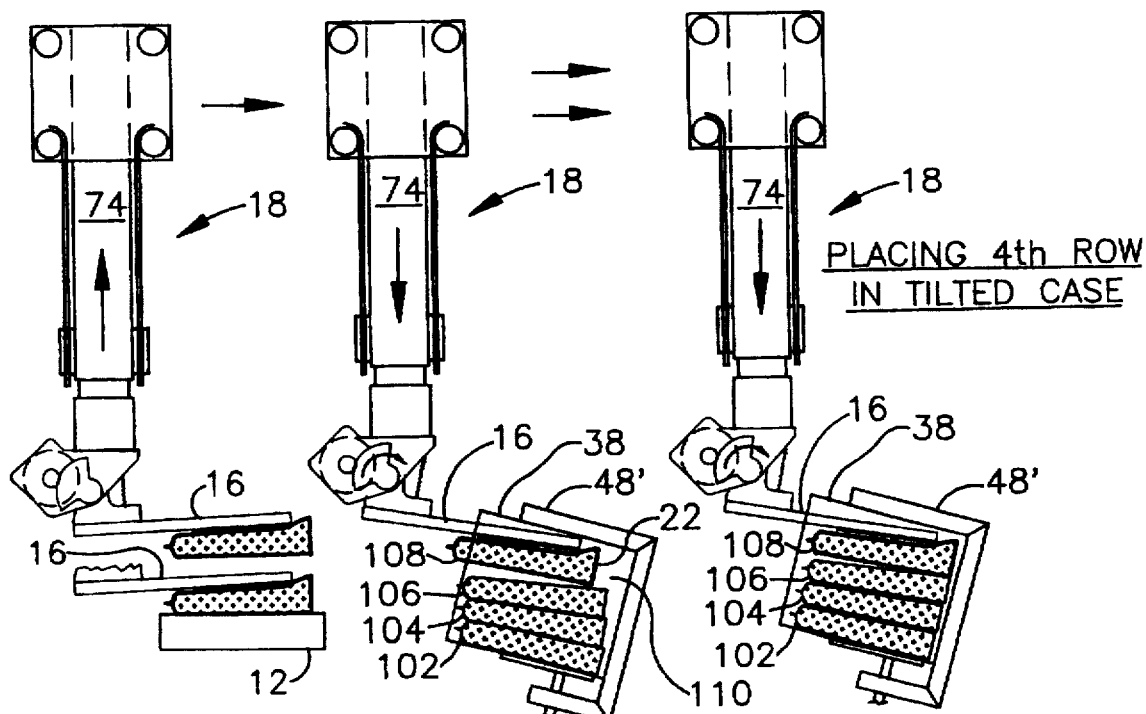

APPARATUS AND METHOD FOR PACKING STAND-UP POUCHES INTO CARTONS

This invention relates to a packaging apparatus and method for handling flexible bag products, especially those known as stand-up pouches, to pack them into cartons.

A relatively recently package for products, especially food products, is a form of flexible bag known as the stand-up pouch. This bag is made from flexible plastic materials and is flat before being filled with product. In the vertical position, as the product moves by gravity to the bottom of the pouch which flexes in thickness so that the combination of the thickness and width forms a base which permits the flexible bag to stand in a vertical position.

It is a common practice for manufacturers to place these filled stand-up pouches into shipping cartons for transportation to a user. When the carton is opened, the bags are standing in their vertical stand up position for withdrawal and stand up and usage by the consumer in the stand-up position. Loading such bags into a shipping carton is difficult because the bags when in their stand-up position are bulged out at the base and fill up the shipping carton so that when bags are placed therein, it is difficult to find space for the last bags. Of course, the carton could be made larger in the first place, but this would require greater use of materials, greater shipping costs, and permit the products to more readily shift in transit, all of which are preferably avoided by the manufacturer. The placement of the pouches in cartons at the present time is primarily done by hand because of the difficulty of doing such packaging.

SUMMARY OF THE INVENTION

The present invention provides an apparatus and method for placing flexible pouches in a vertical position in a carton by tilting the carton and its open top on its side and placing and pushing multiple rows of overlapping flexible pouches into the carton. Prior to the placing of the rows of flexible pouches into the carton, they are partially flattened by suitable means such as a flattening vibrating conveyor table and then collated and assembled at a pick-up station with the pouches being overlapped with one another in a single row. The row is picked up by a thin vacuum head on the end of a robotic arm and moved and placed into the tilted carton with the sequence being repeated with subsequent rows until the carton is filled and tilted back into position. The vacuum pick-up head is a thin, cantilevered head which is caused to tilt during the transfer from a pick-up station to the carton. The leading edge of the pick-up head picks up the row of pouches a short distance from the base end pouches where the maximum thickness of the pouch is located when the pouch is on its side. The difference in thickness at the base end from the remaining part of the pouch is a substantial portion of the thickness of the thin pick-up head and in some situations may even be greater than the thickness of the pick-up head. This enables the pick-up head to readily enter the carton, release its vacuum and then be withdrawn. Thus a highly efficient rapid loading of cartons of minimum size with stand-up flexible pouches is achieved by the special apparatus and method of operation.

The advantages of the present invention will be more fully appreciated by the following detailed description thereof.

BRIEF DESCRIPTION OF THE DRAWINGS

FIGS. 13A, B and C are three sequential views showing a row of pouches being picked up and moved to be placed in a tilted carton.

FIGS. 14A, B and C are views similar to FIGS. 13A, B and C with the placement of a second row of pouches in the tilted carton.

FIGS. 15A, B and C are views similar to the views of FIGS. 13A, B and C with the placement of a third row of pouches in the tilted carton.

FIGS. 16A, B, C and D are similar to FIGS. 13A, B and C but with the placement of the fourth and final row of pouches in the tilted carton to fill the case.

DETAILED DESCRIPTION OF THE PREFERRED EMBODIMENT

Figure 1:
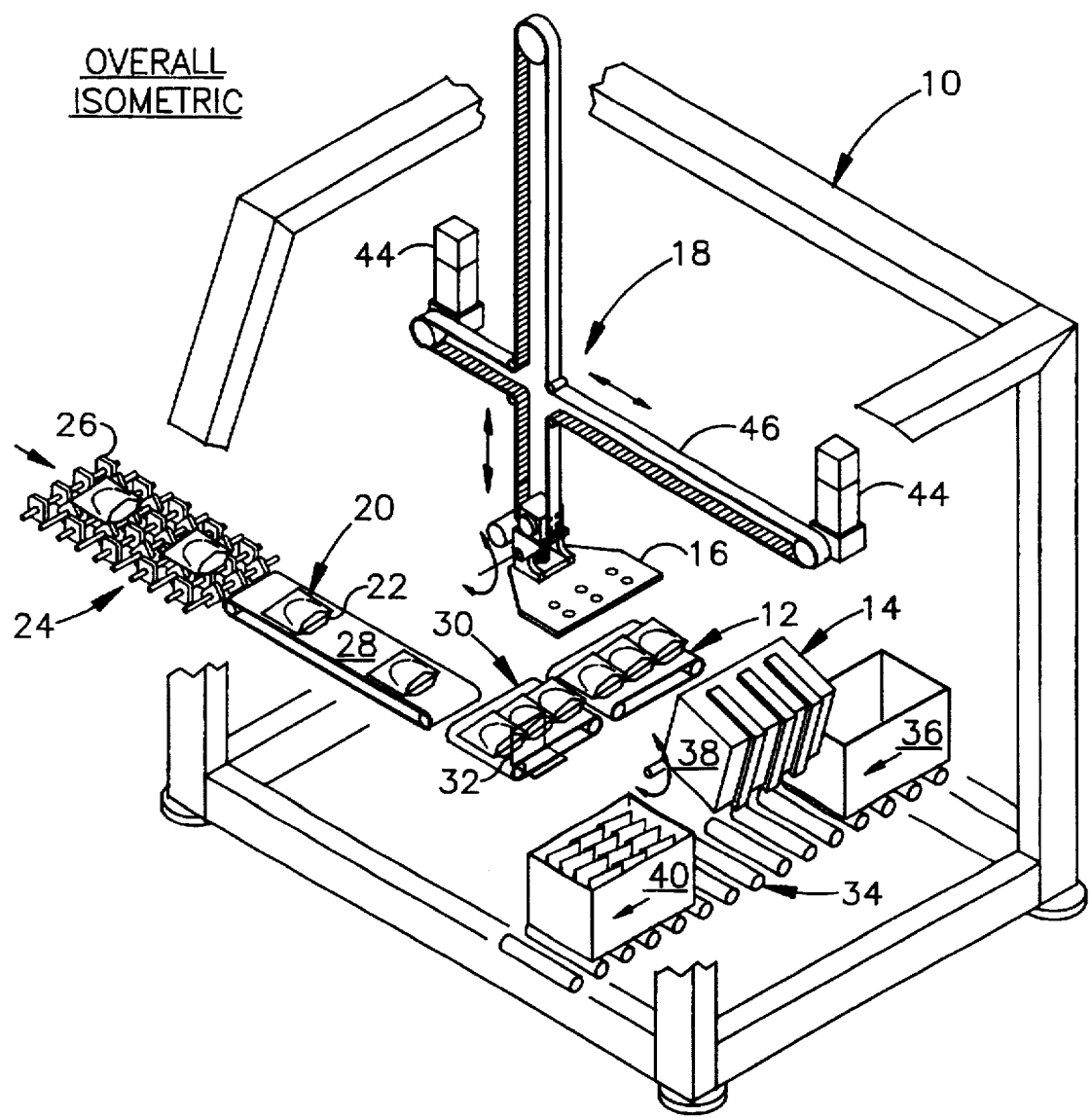
FIG. 1 is a schematic isometric illustration of the invention including a conveying mechanism for flexible pouches, a flat thin vacuum pick-up head, a transfer mechanism, and a conveying mechanism for the shipping cartons.

With reference to FIG. 1, there is shown an overall schematic view in perspective of the present invention depicting the apparatus for placing flexible pouches in a carton or case. FIG. 1 shows a frame 10 for supporting the apparatus and a pick-up station 12 where the flexible pouches are assembled prior to being picked up by the thin vacuum pick-up head 16. The thin vacuum pick-up head is cantilevered at the end of a transfer mechanism 18 and picks up a row of flexible pouches and places them a carton at carton loading station 14.

The contents of the flexible stand-up pouches 20 migrate to the base end 22 when the pouches are in their upright position.

In order to partially flatten the filled pouches to make it easier for them to be inserted into the carton, they are first conveyed over a flattening conveyor table 24 which has a series of square conveyor elements or square conveyor rolls 26 which are driven to both convey the pouches as they lay on their side as well as shake their contents into a more flattened and thinner arrangement. Even though the pouches 20 are somewhat flattened, they still maintain a taper and a greater thickness as the base end 22. The partially flattened pouches are then conveyed over a conventional inlet conveyor belt 28 at a typical speed of 120 bags a minute. The bags are driven or propelled onto collation belt 30 which moves transverse to the inlet conveyor belt.

To prevent the bags from overshooting the belt, their propelling moment is arrested by stop 32 which both stops the pouch and permits it to drop onto the collation belt. The collation belt is advanced by stepping motor drives in a coordinated manner to collate a row of pouches which overlap along their adjacent seams prior to being moved onward to the pick-up station 12 where a row of pouches is assembled in an overlapped and collated manner with three bags forming a row being shown. Of course, there could be any number of bags depending on the size of the bags, the cartons and the desires of the user.

The carton loading station 14 is part of a carton conveyor 34 which brings in an empty carton 36 in its upright position with the top being open. The middle carton 38 is like carton 36, but has been pivoted and tilted upward towards pick-up station 12 with the open end adjacent and close to the row of assembled pouches on the pick-up station. After the carton 38 has been filled, it is pivoted back to its upright position and conveyed further to the left to be in the position of carton 40 which shows the pouches after they have been packed into a vertical upright position.

The row of assembled pouches at pick-up station 12 is moved and placed in the cartons one row at a time until the rows stacked together fill the carton. The movement is carried out by the thin vacuum pick-up head 16 contacting the row of flexible packed pouches with the vacuum then being actuated so as to be able to hold the pouches as they are moved into the carton where the vacuum is then broken and the pouches permitted to remain in the carton as the thin vacuum pick-up head 16 is withdrawn.

The head 16 is cantilevered on a pivoting mechanism 42 mounted at the end of transfer mechanism 18. The transfer mechanism is a cross-belt robotic system that can move the thin pick-up head from left to right and up and down. It is basically a robotic arm with the mechanism being available from Blueprint Automation, Inc. at 5723 South Laburnum Avenue, Richmond, Va. 23231 or a similar type of robotic movement from W. Strothmann GMBH and Company, KG, Altenkamp 5, 33758 Schlob Holte-Stukenbroch, Germany. For a better understanding of the mechanism, reference is made to U.S. Pat. No. 5,063,334 which is incorporated herein by reference. The mechanism is moved by two driving motors 44 and a driving belt 46.

Figure 2:
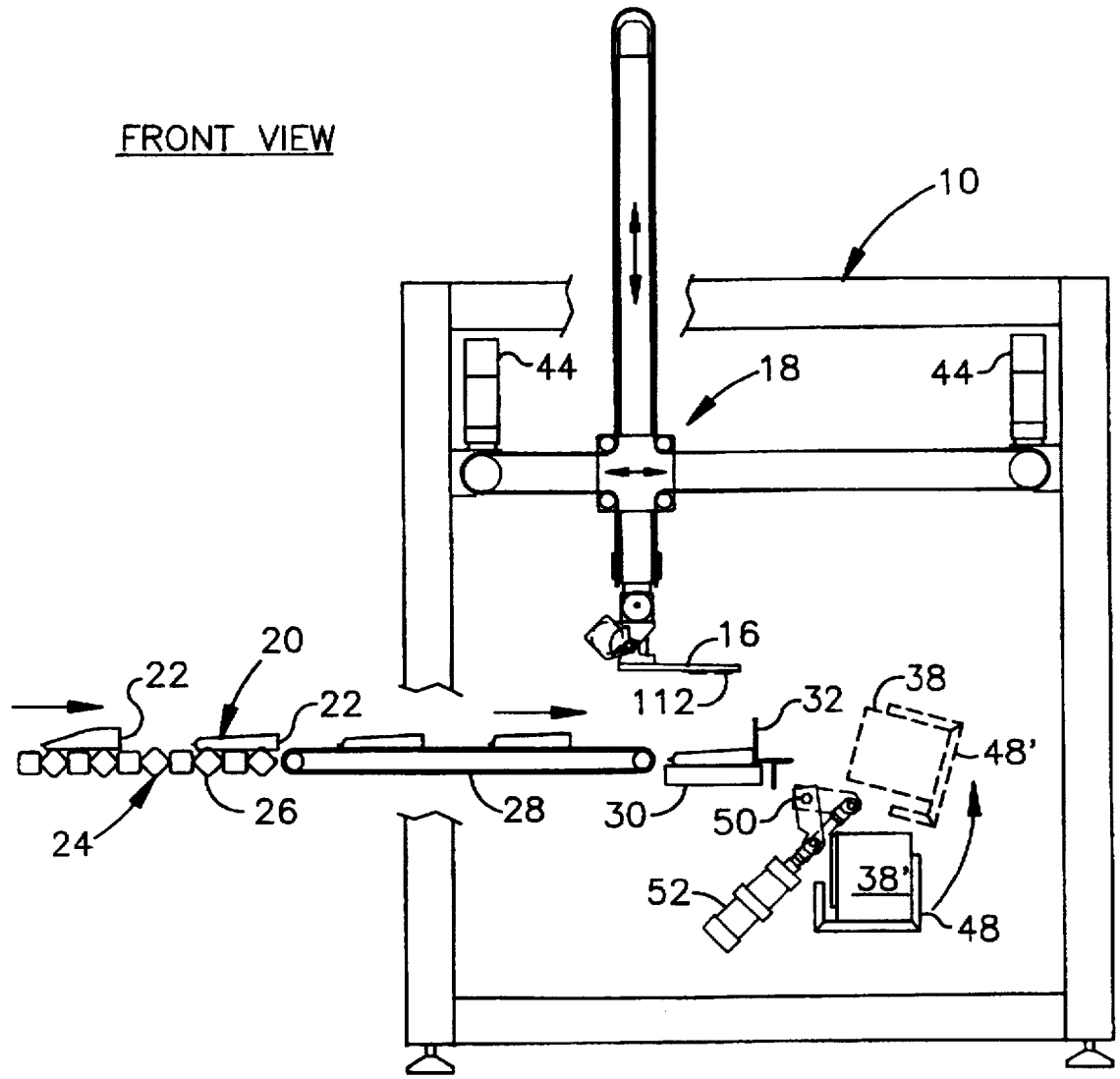
FIG. 2 is a highly schematic front elevational view of the apparatus of FIG. 1 showing the shaking and conveying mechanism for the pouches, the pick-up head and the carton tilting mechanism.

With reference to FIG. 2, the schematic front view shows the flattening conveyor table 24 moving the pouches to the right onto the inlet conveyor belt which shoots them up against the stop 32 where they drop to be arranged in a row on collation belt 30. As is seen on the first pouch to the left, the base end of the pouch starts off relatively thick before the contents are shaken and distributed in the pouch. As seen in the second pouch 20, the pouch becomes more flattened and of even thickness although the base end is still thicker than the remaining part of the pouch.

The transfer mechanism 18 with its drive motors 44 and driving belt 46 is shown in the home position in FIG. 2 with the thin vacuum pick-up head elevated. The carton 38' is shown in solid lines resting in carton cradle 48 which is held by pivot 50. The carton cradle 48 rests within the carton conveyor 34 which is not shown in the figure so as to more clearly illustrate the carton cradle. The carton cradle with the carton is pivoted about pivot 50 by fluid cylinder or motor 52 which both raises the carton and pivots it towards the assembled pouches at pick-up station 12 which is not seen in FIG. 2 since it is behind a collation belt 30. This is an important feature since it reduces the movement distance between the assembled pouches and the carton which helps to speed up the loading cycle, a typical speed being 120 pouches/minute at the present time. It is to be noted that the tilting of the carton 38 to the dotted line position where carton cradle 48' is seen in the elevated position. Carton 38 is preferably tilted between 70 degrees and 90 degrees from its original solid line position.

Figure 3:
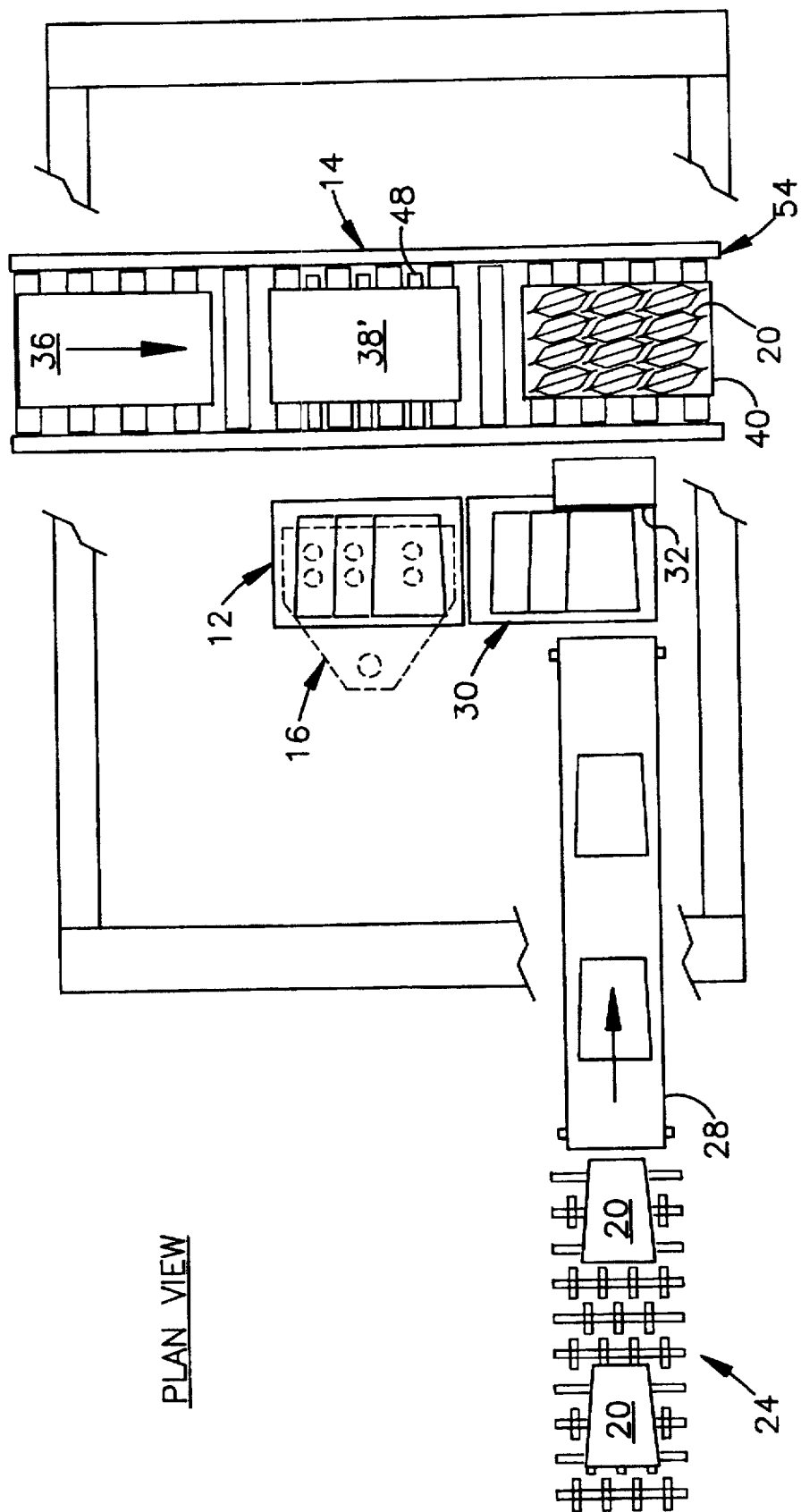
FIG. 3 is a highly schematic plan view of the apparatus of FIG. 1.

With reference to FIG. 3, there is shown a schematic plan view of the apparatus where pouches 20 come in from the left on flattening conveyor table 24 and then inlet conveyor belt 28. It is to be noted that the pouches are evenly spaced and as they are projected off the end of the inlet conveyor belt 28 hit stop 32 to fall onto collation belt 30. The collation belt advances one pouch at a time so that the pouches overlap with one another at least to the extent of their side seams.

As seen in FIG. 3, three such pouches are assembled into a row which is then moved onto the conveyor of pick-up station 12 where they are held until the vacuum pick-up head 16, which is shown in dotted lines in FIG. 3, moves to pick up the row of pouches and inserts them into the carton at carton loading station 14.

As is seen in FIG. 3, the first carton 36 has entered from the top and is open and upright. The second carton 38' is at the carton loading station 14 resting on carton cradle 48 and is upright and open at the top just prior to being tilted into the loading position. The third carton 40 is seen at the bottom in its vertical, upright and opened position after it has been loaded with four rows of overlapping pouches 20. The cartons are moved from one position to another by means of the carton conveyor 54.

Figure 4:
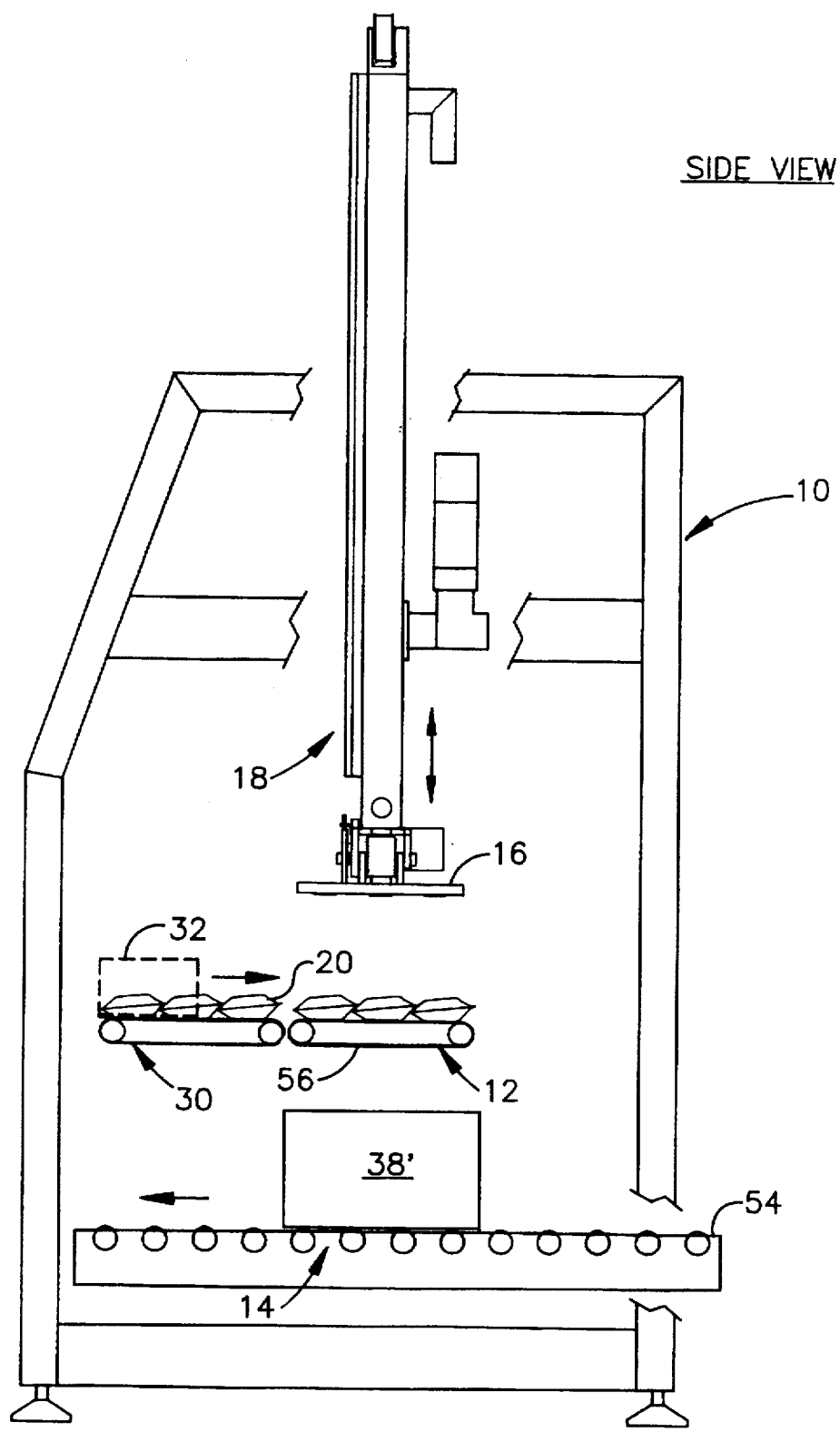
FIG. 4 is a highly schematic side elevation view of the apparatus of FIG. 1.

With reference to FIG. 4, there is shown a schematic side view of the apparatus of FIGS. 1, 2 and 3 with cartons 40 and 36 omitted for purposes of clarity. As is seen, the transfer mechanism 18 with its pick-up head 16 is in the home position. The pouches 20 have been collated in an overlapping row consisting of three pouches on collation belt 30. The stop 32 is shown in dotted lines. Also a row of three overlapping pouches has been assembled on pick-up conveyor belt 56 at pick-up station 12. Upright and open carton 38' is shown at the carton loading station 14 prior to being tilted in position to be loaded.

Figure 5:
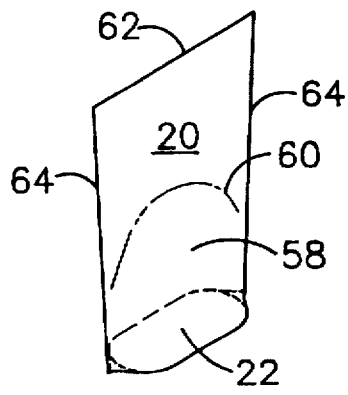
FIG. 5 is a isometric view of the pouch or bag with the contents settled.

With reference to FIGS. 5–9, there is shown the stand-up pouch 20 in various views after it has been filled with product and sealed. FIG. 5 is a isometric view of the pouch 20 in a vertical stand-up position with its base end 22 expanded so that it may stand up. The contents 58 have been settled by gravity into the lower part of the bag with the top of the contents schematically depicted at 60.

The bag is made from a flexible plastic material that has a top flat sealed end 62, two flat sealed sides 64 and a special folding of the material to form the base end 22 such that when the contents settle at the bottom, the base end is expanded in thickness which permits the bag to stand in an upright position. This bottom is arranged so that part of the bag is folded back into the interior and sealed along the side at 66 as a part of the flat sealed side 64. In the middle of the base end of the bag, the part of the bottom 68 folded back inside is not sealed except at the edge of the base end at 70. A typical pouch in its flattened condition without contents is 8½ inches long, 6¼ inches wide with the bottom folded in for a distance of 1½ inches. The seal at the edge of the base end at 70 is approximately ¼ inch in a vertical direction.

Figure 6:
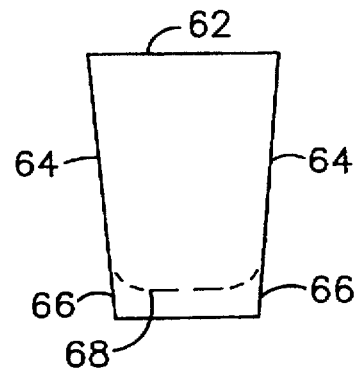
FIG. 6 is a side view of the bag of FIG. 5.
Figure 7:
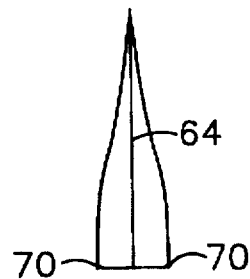
FIG. 7 is an end view of the bag of FIG. 5.

The pouch as seen in FIGS. 5, 6 and 7 shows a bag where the contents have settled to one end and bulged out the base end 22. In this configuration, the top is still approximately 6¼ inches in width and only the thickness of the materials of the bag. The contents are approximately half the height of the bag and base end 22 is bulged to where the bag is approximately 4¾" wide and 2½ inches thick.

Figure 8:
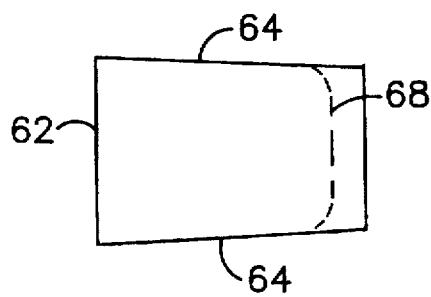
FIG. 8 is a side view of the bag of FIG. 5 laying in a horizontal position with the contents partially flattened.
Figure 9:
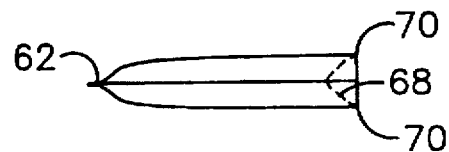
FIG. 9 is an end view of the bag of FIG. 8.

With reference to FIGS. 8 and 9, there is shown the bag after it has been flattened and laid on its side. In this position, the contents have been more equally distributed within the bag and the base end is approximately 1½ inches thick.

Figure 10A:
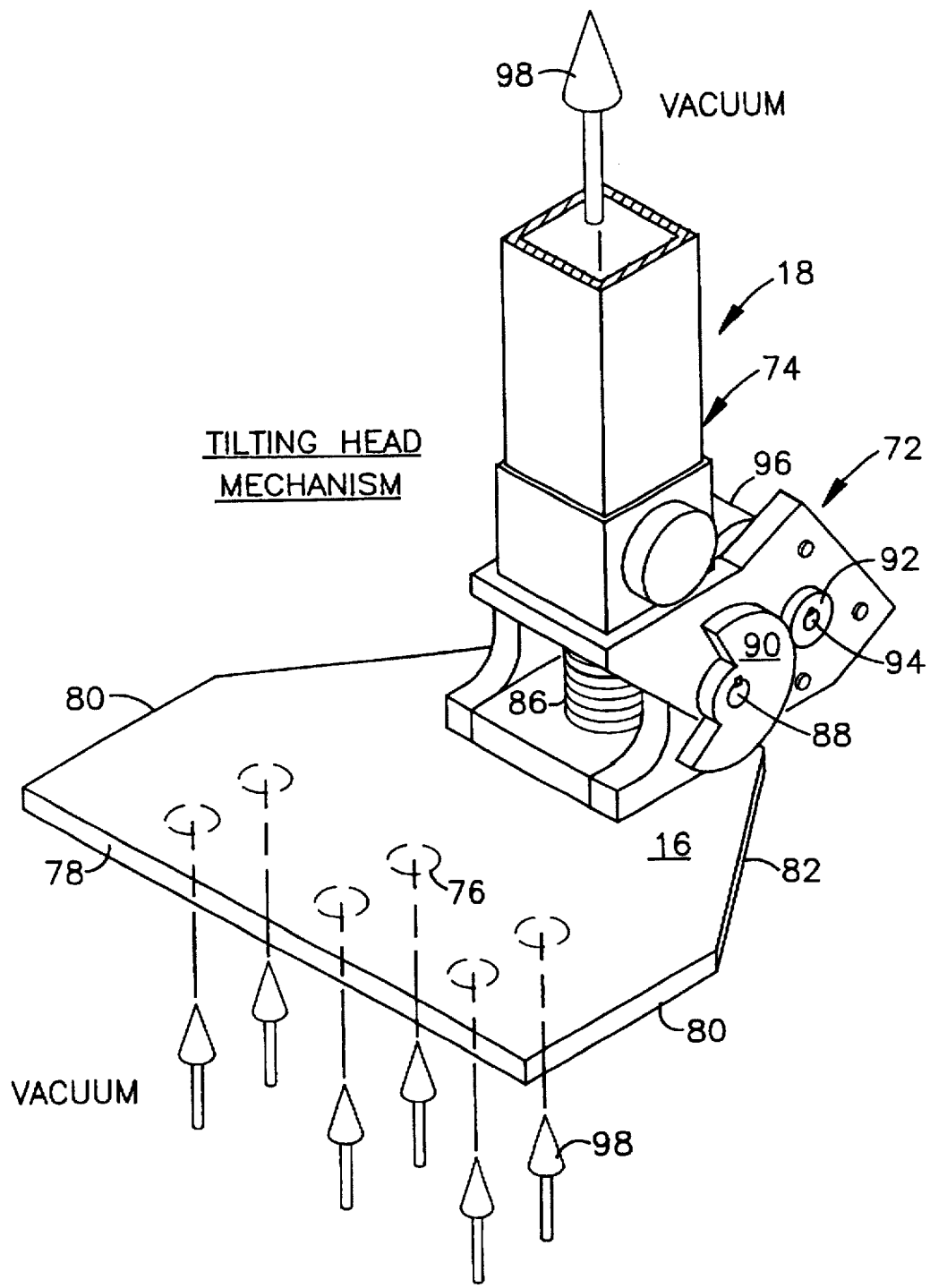
FIG. 10A is a schematic perspective view of the tilting head mechanism for the thin flat vacuum pick-up head.
Figure 10B:
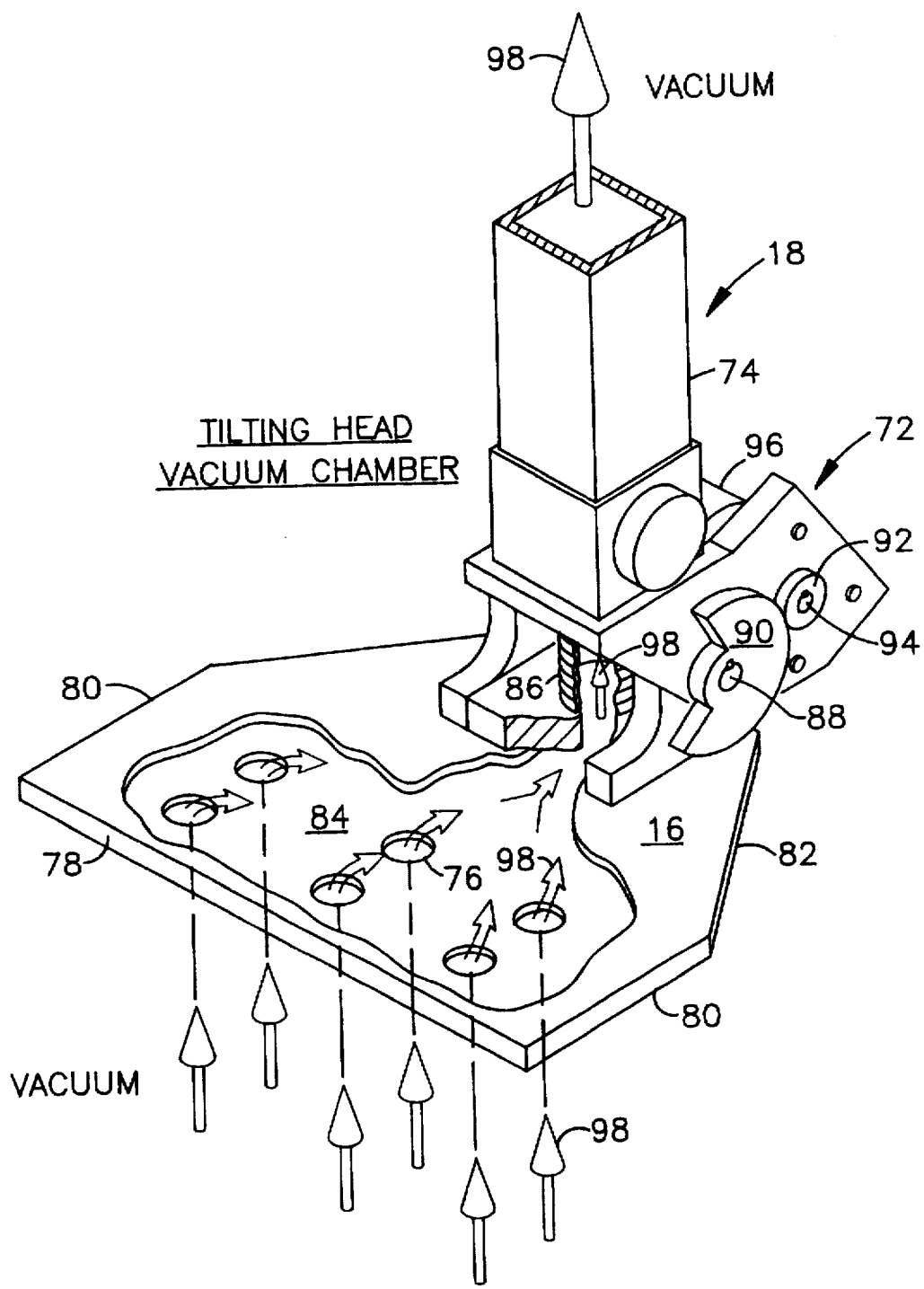
FIG. 10B is view similar to FIG. 10A with part of the top of the vacuum head broken away to show the pattern of air movement.

With reference to FIG. 10A, there is shown the tilting head mechanism 72 which is attached to the vertical arm 74 of the transfer mechanism 18. Only the bottom end of the vertical arm 74 is shown schematically in 10A for purposes of illustration. The tilting head mechanism has a thin vacuum pick-up head 16 which is approximately ½ inch in thickness. This head is hollow as is shown in FIG. 10B, with part of the head broken away so that the bottom vacuum holes 76 can be readily seen. The leading edge 78 and side edges 80 define the area where the vacuum holes are located and the area is of a dimension to accommodate an entire row of pouches so that they can be picked up and moved as a row into a carton. As is seen, the side edges 80 are straight and parallel to one another making the vacuum pick-up area rectangular. The trailing edge 82 of the pick-up head tapers to the rear where it is mounted to the tilting head mechanism 72.

The gasket 112 on the underside of pick-up head 16 (see FIGS. 2 and 11) is not shown.

The bottom surrounding the vacuum area is preferably fenced in by a gasket (which is not shown) to assist in applying the vacuum to the flexible pouches. The interior chamber 84 of the pick-up head is connected to a vacuum source through flexible vacuum conduit 86 which is in turn connected to the hollow vertical arm 74 which is connected to the vacuum source (not shown). The pick-up head tilts in a controlled manner about a horizontal axle 88 keyed to a sector gear 90 which in turn is driven by a drive gear 92 keyed to driver axle 94 rotated by motor 96. The direction of the vacuum flow is shown by darts 98.

Figure 11:
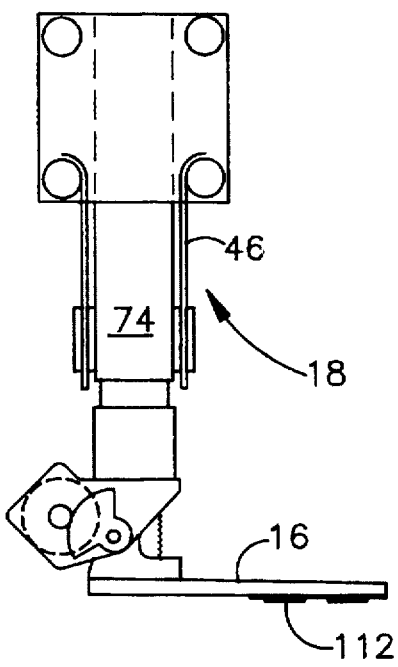
FIG. 11 is a schematic view showing the position of the pick-up head, pouch and carton when the pick-up head is in its initial and home base position.

With reference to FIG. 11, there is shown in schematic form the relative positions of the tilted carton 38, a row of pouches 20 arranged on pick-up station 12 and the thin vacuum pick up head 16 carried by transfer mechanism 18. The pick-up head 16 is at its home base position leveled horizontally with the vertical arm 74 in a raised position. This is just prior to the beginning of a sequence of loading the pouches into the carton until the conclusion of fully loading the carton as will be seen in FIGS. 12 to 16D.

Figure 12:
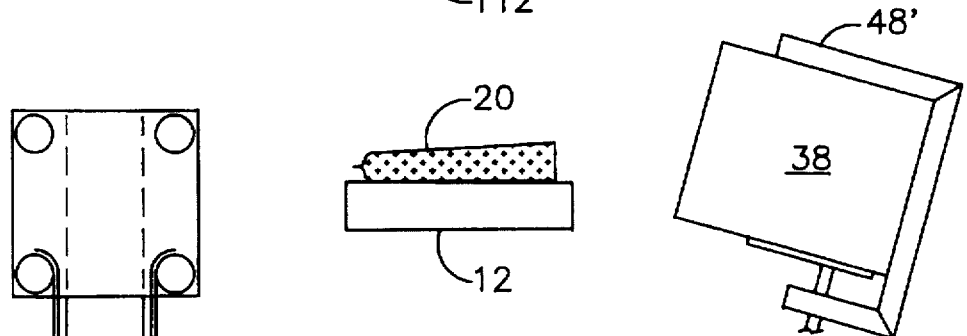
FIG. 12 is a view similar to FIG. 11 with the pick-up head moved to a pick-up position.
Figure 12:
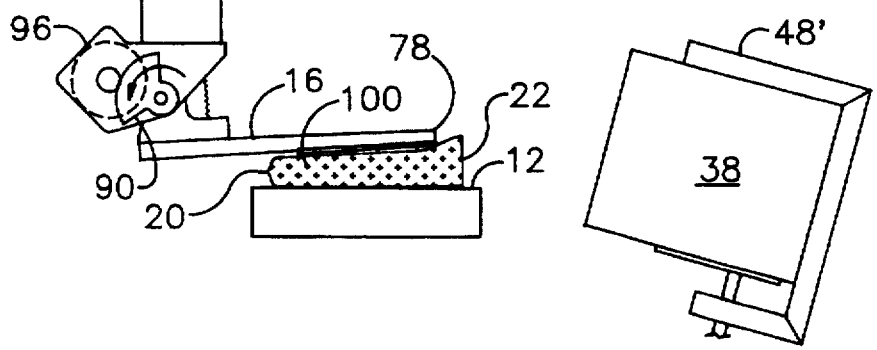

With reference to FIG. 12, the vertical arm 74 has moved downward and the sector gear 90 has been rotated by motor 96 to raise the leading edge 78 so that the pick-up head has been tilted to a −4 degree angle. It is to be noted that the pick-up head 16 has contacted the row of pouches with the leading edge 78 stopping short of the base end 22 which is typically on the order of one inch from the bottom. This is an important factor since as seen in FIG. 12, the base end 22 is the thickest part of the pouch so that the approximately ½ inch thickness of the thin pick-up head (not counting the thickness of the gasket) only partly adds to the thickness of the combined pick-up head and pouch and in some instances will not add any increase to the thickness. In other words, the difference in thickness between the base end of the pouch 22 and the thickness of the intermediate section 100 is a substantial amount of the thickness of the pick-up head 16. This is important since, as will be seen later, it reduces or eliminates the intrusion of the thickness of the pick-up head when it places and pushes the last row of pouches into the carton. It is to also be noted in FIG. 12, that the −4 degree angle is chosen to approximately match the slope of the taper of the pouch from its top end to its base end.

The operation is such that once the pick-up head is placed downward against the row of pouches, a vacuum is drawn on the pick-up head which causes the row of pouches to be sucked against the underside of the head prior to them being lifted and placed in the carton.

With reference to FIGS. 13A, 13B and 13C, there is shown a sequence of operations for placing the first row of pouches in the tilted carton. FIG. 13A is the same as a broken-away lower part of FIG. 12 and is just prior to the row of pouches being lifted by the vacuum head. FIG. 13B shows the pouches as they have been lifted from the pick-up station 12 by means of the vertical arm 74 moving upward carrying with it the pick-up head 16. FIG. 13C shows the pouches after they have been transported by movement of the transfer mechanism 18 to the right, and the lowering of the vertical arm 74 to the downward position and the tilting of the pick-up head 16 downward so that the combined action of moving to the right, lowering and tilting to match the angle of the carton serves to place the first row of pouches into the carton as shown. The tilting of the pick-up head from the −4 degree position to the positive angle shown in FIG. 13C is carried by the rotation of sector gear 90 driven by motor 96. The position shown in FIG. 13C is just prior to the pouches being released by the pick-up head and the head being returned to its position to start another sequence for the second row of pouches.

With reference to FIGS. 14A, 14B and 14C, there is a similar sequence to those shown in FIGS. 13A, 13B and 13C, except on this occasion the second row of pouches 104 are stacked on the already placed first row of pouches 102 in the carton 38. On this occasion the downward movement of the vertical arm 74 is adjusted accordingly since there is no necessity for moving as far downward with the second layer.

With reference to FIGS. 15A, 15B and 15C, there is shown a sequence of placing the third row 106 into the carton 38 with the third row stacked on top of the first 102 and second row 104. Otherwise this sequence of views is similar to the sequence shown in FIGS. 13A, 13B and 13C and shown in FIGS. 14A, 14B and 14C, except the downward movement of the vertical arm 74 is of a shorter distance since the row of pouches 106 do not have to be moved as far downward.

With reference to FIGS. 16A, 16B, 16C and 16D, there is shown a sequence for placing the last row of pouches 108 into the carton 38. FIGS. 16A and 16B are similar to FIGS. 13A, 14A, 15A and FIGS. 13B, 14B and 15B except once again the placing of the final and fourth row of pouches 108 does not require the vertical arm 74 to move as far downward.

As seen in FIG. 16C, the flat pick-up head is positioning the last and fourth row of pouches into the carton 38. This is the point that the thickness of the pick-up head becomes of significance. As mentioned earlier, the base end 22 of the pouches is thicker than the intermediate section 100 where the pick-up head is located. This difference in thickness is a substantial portion of the thickness of the thin pick-up head and in some cases may be even greater than such thickness. This permits the pick-up head to place the last row of pouches into the carton without substantial interference from the carton wall as can be seen in FIGS. 16C and 16D. Also note the space 110 in FIG. 16C at the bottom of the previous rows of pouches. Since the pouches are somewhat tapered and their walls have low friction, they have a tendency to slide over one another to create the space shown. The pick-up head 16 not only picks up and places the row but pushes the row and the underlying rows of pouches towards the bottom of the container as shown in FIGS. 16D before releasing the vacuum and withdrawing the pick-up head. This is an important feature and may be supplemented by previously not only placing a row of pouches in the carton but actually pressing down on the row to reduce the height of the stacked rows. This downward compression movement is preferably reserved for the last row as shown in FIG. 16D where the pick-up head not only picks up and places the last row and pushes it into the container or carton, but also pushes it further downward to help compress the stacked rows and better enable the withdrawal of the head after the vacuum is broken and the compression removed by slightly elevating the head.

After the pick-up head 16 of FIG. 16D is withdrawn from the carton 38, it returns to its home position as shown in FIG. 11 ready to start the entire sequence again for the next carton. Meanwhile, the carton 38 is tilted to the right to its vertical position with the pouches upright as shown in FIG. 1, and a new carton is positioned at the carton loading station 14 adjacent pick-up station 12 and tilted in position for loading of the pouches therein.

Once the carton is tilted back in position with the pouches arranged vertically, the contents of the pouches will shift by gravity towards the bottom of the carton spreading the thickness at the base end until restrained by the adjacent pouches. Thus, there is a right fit at this time which serves to stabilize any movement of the pouches in this position.

While the loading of stand-up pouches into a carton could be more easily achieved by enlarging the size of the carton, this would serve to utilize a greater quantity of material which would increase the cost of the cartons and the shipping costs and would not have the advantage of stabilizing the bags with one another.

The versatility of the apparatus is such that it can be readily changed for regular vertical placement of bags laying on their side directly into a carton by changing the head to one that picks up the cartons vertically and places them vertically into the carton with alternate rows being oriented 180 degrees by a 180 degree rotation of the alternate head so that the base end of one row would be adjacent the top of the next row. In this case, the tilting of the carton and the use of a cantilevered and tilting pick-up head would not be required.

Although the invention has been primarily described with specific details of a typical and preferred embodiment, those skilled in the art will appreciate that the size of the pouches, the type of the pouches, and the quantity of the pouches being located in a carton can be varied as required by the user.

There has been disclosed here above a preferred embodiment of the invention as presently contemplated and it is to be understood that various changes and modifications may be made by those skilled in the art without departing from the spirit of the invention.

What is claimed is:

1. Apparatus for placing flexible pouches in a carton comprising:
   a pick-up station for holding a row of flexible pouches;
   a carton loading station for presenting a carton with an open side;
   a thin vacuum pick-up head for picking up a row of flexible pouches at said pick-up station and inserting them into the open side of a carton as a plurality of stacked rows at said carton loading station; and
   a transfer mechanism for moving said head between said pick-up station and said carton loading station.

2. The apparatus of claim 1 which further includes:
   a carton cradle located at said carton loading station adjacent to said pick-up station for tilting a carton with an open top on its side upwardly and towards said pick-up station so as to present the open top as an open side in close proximity to said pick-up station.

3. The apparatus of claim 1 which further includes:
   a tilting head mechanism located between said pick-up head and said transfer mechanism for adjusting the angle of said pick-up head.

4. The apparatus of claim 3 wherein said tilting head mechanism further includes a motor driven mechanism for tilting said pick-up head in a controlled manner.

5. The apparatus of claim 1 which further includes:
   a flattening conveyor mechanism located in advance of said pick-up station for flattening the flexible pouches.

6. The apparatus of claim 1 which further includes:
   a collation station for collating the flexible pouches prior to said pick-up station and transferring the collated flexible pouches to said pick-up station.

7. The apparatus of claim 4 which further includes:
   an arm on said transfer mechanism to which said tilting head and pick-up head is attached; and
   a flexible vacuum conduit located between said arm and said pick-up head for conducting a vacuum from said pick-up head.

8. A method for placing flexible pouches in a carton comprising the following:
   A. providing a pick-up station for holding a row of flexible pouches;
   B. providing a carton having an open side;
   C. providing a thin pick-up head;
   D. providing a transfer mechanism for moving said thin pick-up head;
   E. providing a quantity of flexible pouches containing a product which pouches have relatively flat sides, a base end, an intermediate section and a top end with the difference in thickness between said base end and said intermediate section being a substantial amount of the thickness of said thin vacuum pick-up head;
   F. assembling a row of flexible pouches laying on their side on said pick-up station with said base ends of said pouches pointing in the same direction;
   G. Picking up said row of flexible pouches with said thin pick-up head by placing said head over said intermediate section but not said base end of said flexible pouches;
   H. Moving said row of picked up flexible pouches into said carton through said open side by said transfer mechanism;
   I. releasing said row of said flexible pouches from said pick-up head into said carton and moving said pick-up head to its starting position; and
   J. repeating F to I by stacking additional rows of pouches in said carton until said carton is full.

9. The method of claim 8 which further comprises:
   providing a tilting head mechanism located between said pick-up head and said transfer mechanism for adjusting the angle of said pick-up head.

10. The method of claim 9 which further comprises:

tilting said pick-up head to a negative angle to accomodate the slope of said row of flexible packages prior to said pick-up head picking up said row and moving said row into said carton.

11. The method of claim 2 which further comprises:

providing a carton cradle adjacent said pick-up station for cradling said carton in an upright position with an open top;

rotating said cradle and said upright carton upward and to the side to a closer position to said pick-up station with the open top facing the pick-up station; and rotating said cradle back to its original position after said carton is full.

12. The method of claim 9 which further comprises:

stacking the last row of pouches to fill said carton by said pick-up head pressing down on said last row to reduce the height of said stacked rows and pushing said last row and the underlying rows toward the bottom of said carton.

* * * * *